United States Patent [19]

Kozachevsky et al.

[11] Patent Number: 4,908,090
[45] Date of Patent: Mar. 13, 1990

[54] APPARATUS FOR PRESSURE-FORMING AND CURING OF POLYMER PRODUCTS

[76] Inventors: Gennady G. Kozachevsky, ulitsa Yakubovskogo, 18, korpus 2, kv. 271.; Valery V. Guskov, ulitsa Kulman, 13, kv. 19.; Vladimir P. Boikov, ulitsa Ya.Kolasa, 139, kv. 172., all of Minsk; Jury N. Gorodnichev, ulitsa Gertsena, 37, korpus 1, kv. 72., Moscow; Svetlana I. Sizova, ulitsa Ya.Kolasa, 139, kv. 172., Minsk; Viktor A. Moroz, ulitsa Kuibysheva, 8a, kv. 24., Bobruisk; Isaak Y. Kachur, ulitsa M.Gorkogo, 28, kv. 62., Bobruisk; Alexandr S. Kholmovsky, ulitsa Minskaya, 63, kv. 88., Bobruisk; Nadezhda V. Lapshina, ulitsa Lobachevskogo, 8, kv. 2., Moscow, all of U.S.S.R.

[21] Appl. No.: 130,539
[22] PCT Filed: Jan. 30, 1986
[86] PCT No.: PCT/SU86/00005
  § 371 Date: Sep. 17, 1987
  § 102(e) Date: Sep. 17, 1987
[87] PCT Pub. No.: WO87/04660
  PCT Pub. Date: Aug. 13, 1987

[51] Int. Cl.[4] .............................. F16G 5/00
[52] U.S. Cl. ..................... 156/446; 156/140; 156/141; 156/156; 156/500; 425/35; 425/43; 425/47
[58] Field of Search .............. 156/139, 140, 141, 156, 156/446, 500; 425/28.1, 28 B, 28 D, 28 P, 43, 44, 47, 34.1, 35; 264/310, 311

[56] References Cited
U.S. PATENT DOCUMENTS
4,379,011 4/1983 Henderson .................... 156/140
4,710,251 12/1987 Borchardt .................... 156/139

FOREIGN PATENT DOCUMENTS
1704905 5/1971 Fed. Rep. of Germany.
2116994 10/1971 Fed. Rep. of Germany.
2248865 4/1973 Fed. Rep. of Germany.
410972 5/1974 U.S.S.R..
514728 6/1976 U.S.S.R..

Primary Examiner—Jay H. Woo
Assistant Examiner—Timothy W. Heitbrink
Attorney, Agent, or Firm—Fleit, Jacobson, Cohn, Price, Holman & Stern

[57] ABSTRACT

Apparatus for the pressure-forming and curing of polymer products incorporates two moulds (1) and a forming device, the moulds (1) being sturdily linked to each other with provision for setting the separating distance as required and for revolving on a fulcrum pin (9) so that the material of a circular product can be wound therearound. The moulds (1) are semicylinders which face each other with their flat sides and are sturdily interlinked by two parallel plates (2) so as to form integrally therewith a sturdy building core having a contoured outside surface. The forming device is a girdling structure which embraces the semicylinders (1) and the plates (2) circumferentially and is made up of at least two elements at least one whereof is located with provision for radial displacement in the course of pressure-forming.

3 Claims, 2 Drawing Sheets

APPARATUS FOR PRESSURE-FORMING AND CURING OF POLYMER PRODUCTS

TECHNICAL FIELD

The present invention relates to the manufacture of circular polymer products and has specific reference to apparatus for the pressure-forming and curing of polymer products.

PRIOR ART

There is known an apparatus for the pressure-forming and curing of polymer products incorporating two contoured moulds in the form of cylinders which are rigidly linked to each other by a screw pair and can revolve about a common axis. A means of forming and curing consists of platens (cf. FRG Patent No. 2,248,865).

The known apparatus copes with the forming and curing stepwise, in a number of cycles, and therefore erroneous pitching of cogs is likely to occur, impairing product quality. The process is time-consuming and, as a result, its productivity is low.

SUMMARY OF THE INVENTION

The principal object of the invention is to provide an apparatus for the pressure-forming and curing of polymer products wherein the features of construction of interlinked moulds and those of a forming means would improve product quality and speed up the process.

This object is realized by disclosing an apparatus for the pressure-forming and curing of polymer products comprising two moulds and a forming means, the moulds being sturdily linked to each other with provision for setting the separating distance as required and for revolving about a common axis so that the material of a circular product can be wound therearound, wherein according to the invention the moulds are semicylinders which face each other with their flat sides and are sturdily interlinked by two parallel plates so as to form integrally therewith a sturdy building core having a contoured outside surface, whereby the forming means is a girdling structure which embraces the semicylinders and plates circumferentially and is made up of at least two elements at least one whereof is located with provision for radial displacement in the course of pressure-forming.

It is expedient to have the girdling structure made up of two elements located one inside the other, the inside element contiguous with the product being an airtight hose connected to a source of pressure which causes it to displace radially, whereby the ends of the air-tight hose overlap each other and the end contiguous with the product has a flat tip.

The girdling structure of such construction provides for applying a pressure to the product which is uniform at every point thereof. It also prevents overflows of the polymer material at the joint, improving thus product quality. The removable air-tight hose renders the apparatus suitable for forming belts of various lengths under the conditions of uniform pressure applied to the blank.

It is also expedient to have the girdling structure made up of four parts located pairwise opposite to each other and movably linked to actuating means used during the pressure-forming.

Such a girdling structure is simple and reliable in operation.

The apparatus provided in accordance with the invention improves product quality, for a uniform pressure is applied to the entire product, and speeds up the process of forming.

BRIEF DESCRIPTION OF THE DRAWINGS

A preferred embodiment of the invention will now be described by way of example with reference to the accompanying drawings in which.

DESCRIPTION OF THE PREFERRED EMBODIMENT

Figure 1:
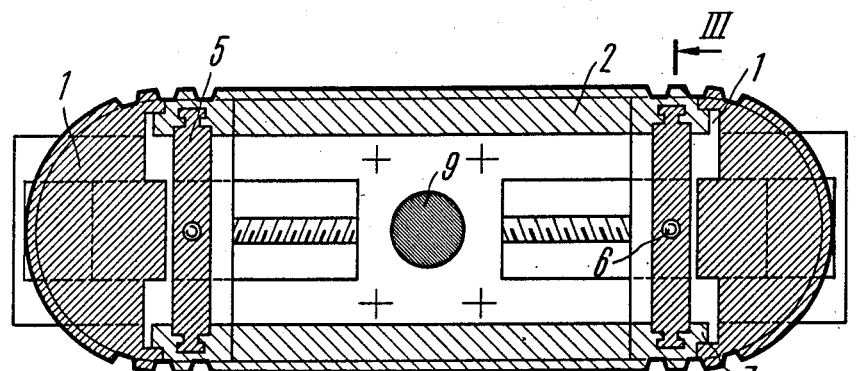
FIG. 1 is a sectional elevation of the apparatus for the pressure-forming and curing of polymer products according to the invention.
Figure 2:
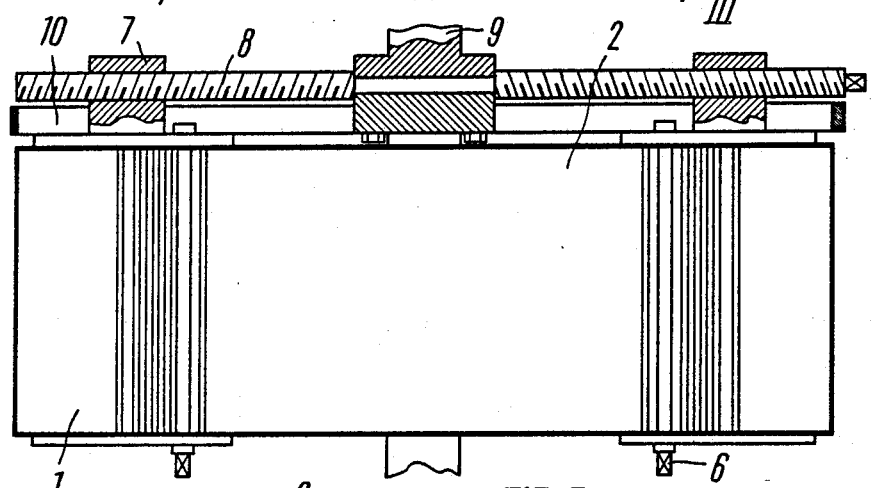
FIG. 2 is a plan view of FIG. 1.
Figure 3:
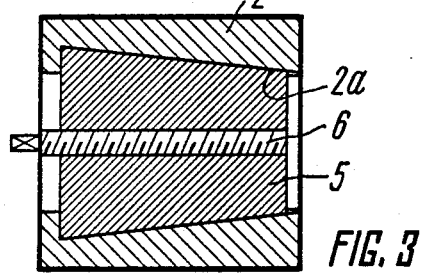
FIG. 3 is a section on line III—III of FIG. 1.

The apparatus for the pressure-forming and curing of polymer products incorporates two moulds 1 (FIGS. 1, 2) which are semicylinders, also shown at 1, facing each other with their flat sides; they are sturdily interlinked with provision for setting the separating distance as required with the aid of two parallel plates 2 which form with the semicylinders 1 a sturdy building core having a contoured outside surface which is a replica of the contour of the product formed. Projections 3 of the plates 2 contact the surface of the semicylinders 1, effecting the semicylinder-to-plate link. The hold-fast function is carried out by a wedge 5 (FIG. 3) a T-shaped projection whereof contacts taper walls 2a of a T-shaped groove formed by the plates 2. A screw 6 working in the wedge 5 causes this to displace axially so as tighten up the plates 2.

The distance between the semicylinders 1 (FIG. 2) is adjusted with the aid of a screw pair, comprising a nut 7 and a screw 8, depending on the length of the product formed. The nuts 7 are secured to the semicylinders 1 and the screw 8 works in the nuts 7. The plates 2 may vary in length depending on the length of the product.

The building core formed by the semicylinders 1 and the plates 2 is capable of revolving on a fulcrum pin 9 so that the material of the product can be wound therearound. The screw 8 passes through the fulcrum pin 9.

For extra stiffening of the semicylinders 1, a side arm 10 attached to the fulcrum pin 9 and extending between the building core and the screw 8 is provided with recess fitting whereinto are the nuts 7.

Figure 4:
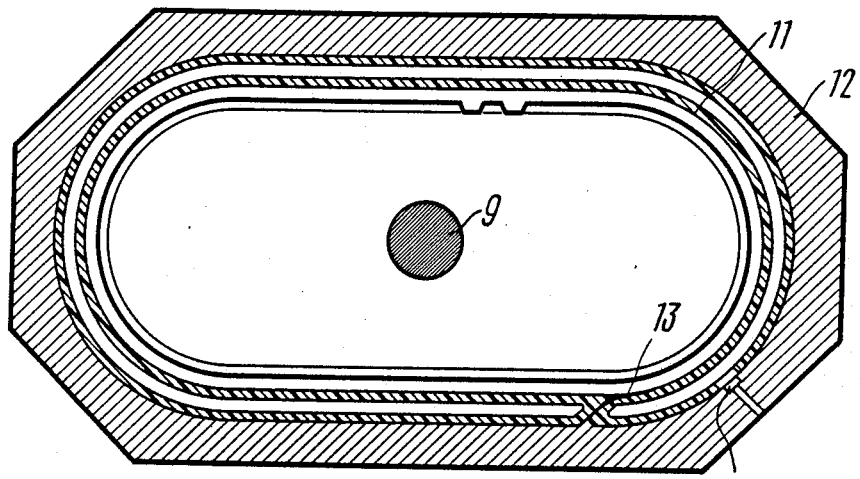
FIG. 4 is a sectional elevation of the apparatus according to the invention featuring a forming means made up of two parts.

The forming means (FIG. 4) consists of a girdling structure which embraces the semicylinders 1 (FIG. 1) and the plates 2 (FIG. 2) circumferentially and is made up of two elements 11 (FIG. 4) and 12. The element 11 is an air-tight hose connected to a source of pressure and capable of displacing radially in the course of forming. The ends of the hose 11 overlap each other. The element 12 is a ring-shaped rigid housing. The end of the hose contiguous with the product has a flat tip 13 for improving product quality, for the tip 13 prevents overflow of the polymer material at the joint. The hose has a pipe 14 admitted wherethrough is air.

Figure 5:
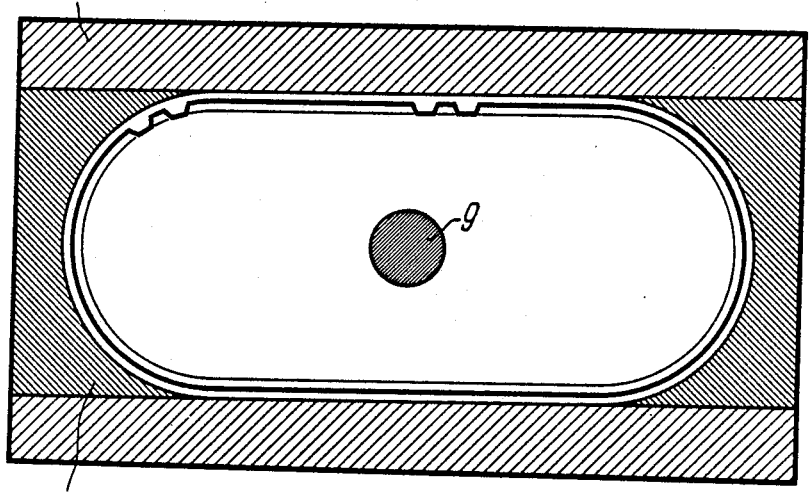
FIG. 5 is a sectional elevation of the apparatus according to the invention featuring a forming means made up of four parts.

The girdling structure which takes car of forming may consist of four parts 15, 16 (FIG. 5) located pairwise opposite each other and movably linked to actuating means (not shown, for any shown actuator suitable for this purpose can be used) which causes them to displace in the course of forming.

For operation, the contoured semicylinders 1 are set by the screw 8 a given distance apart and plates 2 of appropriate length are interposed therebetween, the projections 3 contacting the flat sides of the semicylinders 1. Braced by the wedge 5, the semicylinders 1 and the plates 2 form the sturdy building core wound whereon by a feeding mechanism (not shown) are the constituent elements of the product.

On assembling the circular product, the hose 11 is applied to the building core and the assembly is fitted into the second element 12 of the girdling structure. When compressed air is introduced into the air-tight hose 11 over the pipe 14, the hose 11 extends radially, exerting a pressure on the product. The ring-shaped second element 12 prevents an outward extension of the hose 11. The pressure and temperature applied to the mould form and cure the product.

At the end of the curing, air is bled from the hose 11 and the hose is removed from the building core; so is the product. After that the cycle is repeated.

The flat tip 13 at the end of the air-tight hose 11 contiguous with the product prevents overflow of the polymer material at the overlapping joint and improves product quality.

Circular polymer products of various lengths can be formed and cured by employing the girdling structure made up of four parts 15, 16.

The building core with the elements of the product wound thereupon is introduced between the parts 15 the displacement whereof is limited by the side parts 16. As the parts 16 and 15 are successively shifted inwards, they set up a pressure all the way around the circumference of the blank. The pressure buildup and the temperature applied render operant the process of forming and curing the product.

It will be noted that this process takes place in one step, and the disclosed apparatus yields quality products at a rate faster than ever before.

INDUSTRIAL FIELD OF APPLICABILTIY

The invention can be used to advantage in the manufacture of cogged belts.

We claim:

1. An apparatus for pressure-forming and curing of polymer products, said apparatus comprising:
    two moulds, each of said moulds being a semicylinder having a flat side and a curved surface;
    two spaced apart, parallel plates interlinking said two moulds such that the flat sides of the two moulds face each other, said parallel plates and said moulds forming a building core having a contoured outer surface, said contoured outer surface comprising the curved surfaces of said moulds and outer surfaces of said parallel plates, said building core being revolvable about a fulcrum pin having an axis of rotation so that material for a circular polymer product can be wound around said contoured outer surface of said building core;
    means for setting a separating distance between said moulds in a direction perpendicular to the axis of rotation of the fulcrum pin; and
    forming means comprising a girdling structure which circumferentially embraces said building core such that said girdling structure extends around the contoured outer surface of said building core, said girdling structure comprising at least two elements, at least one of said elements being radially displaceable.

2. An apparatus according to claim 1, wherein the two elements of said girdling structure comprise a radially displaceable inner element and an outer element extending around said inner element such that said inner element is located between the contoured outer surface of said building core and said outer element, said inner element comprising an air-tight hose having overlapping ends.

3. An apparatus according to claim 1, wherein said girdling structure comprises four elements, said four elements being located pairwise opposite to one another and said four elements being movably linked to actuating means.

* * * * *